United States Patent
Sinha et al.

(10) Patent No.: US 7,477,672 B2
(45) Date of Patent: Jan. 13, 2009

(54) MITIGATION OF PHOTODARKENING TO ACHIEVE LASER OSCILLATION AND AMPLIFICATION WITH HIGHLY DOPED FIBERS

(75) Inventors: Supriyo Sinha, Menlo Park, CA (US); Michel J. F. Digonnet, Palo Alto, CA (US); Robert L. Byer, Stanford, CA (US); Jens Limpert, Jena (DE)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/508,550

(22) Filed: Aug. 22, 2006

(65) Prior Publication Data

US 2007/0053400 A1   Mar. 8, 2007

Related U.S. Application Data

(60) Provisional application No. 60/710,541, filed on Aug. 22, 2005.

(51) Int. Cl.
*H01S 3/30* (2006.01)
*H01S 3/03* (2006.01)

(52) U.S. Cl. ............................. 372/64; 372/6
(58) Field of Classification Search .............. 372/6, 372/3, 64
See application file for complete search history.

(56) References Cited

U.S. PATENT DOCUMENTS 5,058,974 A * 10/1991 Mollenauer ............ 385/27
5,953,353 A 9/1999 Headley et al.
6,154,598 A 11/2000 Gavrilovic et al.
6,510,276 B1 1/2003 Jain et al.
2007/0206177 A1 * 9/2007 Anschel et al. ............ 356/28

OTHER PUBLICATIONS

Pennington, D.M., et al. "Compact fiber laser approach to 589nm laser guide stars," p. 1, (2003).
Georgiev, D. et al. "Watts-level frequency doubling of a narrow line linearly polarized Raman fiber laser to 589 nm," (pp. 6772-6776). vol. 13, No. 18. Optics Express (2005).

* cited by examiner

*Primary Examiner*—Armando Rodriguez
(74) *Attorney, Agent, or Firm*—Lumen Patent Firm

(57) ABSTRACT

Photodarkening in active fiber or waveguide devices (e.g. lasers, amplifiers, and incoherent sources such as ASE sources) can be reduced by altering the dopant concentration along the length of the doped fiber. A fiber or waveguide device includes two or more intentionally doped fiber or waveguide sections having different concentrations of one or more dopants. The dopants provide optical gain responsive to pump radiation provided to the fiber device by a pump source. A first optical intensity in a first of the fiber or waveguide sections is greater than a second optical intensity in a second of the fiber or waveguide sections. A first dopant concentration in the first fiber or waveguide section is lower than a second dopant concentration in the second fiber or waveguide section. Thus the dopant concentration is reduced in sections of the fiber or waveguide device having a higher optical intensity. The optical intensity can be due to pump radiation and/or signal radiation. Reduced dopant concentration in regions of high optical intensity reduces photodarkening.

25 Claims, 3 Drawing Sheets

MITIGATION OF PHOTODARKENING TO ACHIEVE LASER OSCILLATION AND AMPLIFICATION WITH HIGHLY DOPED FIBERS

CROSS REFERENCE TO RELATED APPLICATIONS

This application claims the benefit of U.S. provisional application 60/710,541, filed on Aug. 22, 2005, entitled "Generation of Yellow Light by Frequency Doubling Employing a Rare-Earth Doped Fiber Oscillator", and hereby incorporated by reference in its entirety.

GOVERNMENT SPONSORSHIP

This invention was made with Government support under grant number DAAD19-01-1-0184 from DARPA. The Government has certain rights in this invention.

FIELD OF THE INVENTION

This invention relates to fiber lasers.

BACKGROUND

Yellow laser sources are of interest for various applications. The 573-580 nm band is attractive for ophthalmology and dermatology applications, and 589 nm is a wavelength of interest for laser guide star applications. Presently, coherent radiation in this wavelength band is usually provided by bulky and expensive laser sources, such as dye lasers and copper-vapor lasers. Naturally, it would be highly desirable to provide an efficient diode-pumped solid-state laser alternative. Such a solid-state source would include a device that performs nonlinear frequency conversion, since yellow wavelengths are difficult to generate directly from solid-state laser media.

Attempts have been made along these lines. For example, Pennington et al. consider frequency summing the outputs of two fiber lasers (operating at 1583 nm and 938 nm) to provide a yellow source in "Compact fiber laser approach to 589 nm laser guide stars" presented at the Conference for Lasers and Electro-Optics in 2004. Frequency doubling of a Raman-shifted fiber laser has also been considered (e.g., by Sharma in Reviews of Laser Engineering vol. 33, p. 130, 2005). In these examples, special measures are employed (e.g., Raman shifting or sum frequency generation) to overcome the difficulties posed by the lack of efficient high-power solid-state laser sources suitable for direct doubling into the yellow. However, such special measures introduce undesirable complications, and it would be preferable to obtain the desired yellow radiation more simply by frequency doubling.

Direct frequency doubling to the yellow has been demonstrated by frequency doubling a Yb:YAG microchip laser to 565 nm (Burns et al., Optics Communications vol. 207, p. 315, 2002). However, low output power (<1 mW) and low efficiency (<0.1%) were reported in this work. It has proved difficult in practice to provide laser sources more suitable for direct frequency doubling to the yellow. To appreciate these difficulties, it is helpful to consider a specific case.

Yb-doped silica is an attractive gain media for the 1-µm band because of its wide gain bandwidth and high quantum efficiency when pumped at 980 nm. Although the gain bandwidth of Yb-doped silica extends to around 1200 nm, it has been difficult to make fiber amplifiers and lasers operating at wavelengths greater than 1120 nm (which could be frequency doubled to provide yellow radiation). Two reasons for this difficulty are the low emission cross section at these wavelengths, and amplified spontaneous emission (ASE) at shorter wavelengths (especially in the vicinity of 1030 nm, where the gain is much higher), which depletes the Yb population inversion and thus reduces the gain available at longer wavelengths.

A further complication is photodarkening (loss due to optical damage to the fiber), which extends to 1150 nm in Yb-doped silica. Photodarkening is a process by which the high intensity of pump and/or signal light traveling through the gain medium (e.g., a fiber) induces a loss in the gain medium, usually via the creation of color centers. This mechanism has been observed and studied in many laser materials, including recently in Yb-doped silica fibers, as reported by J. J. Koponen et al., "Photodarkening in Ytterbium-doped Silica Fibers", Proc. SPIE vol. 5990, paper c3, 2005. In Yb-doped fibers operated at longer wavelengths, even a small additional loss from photodarkening can prevent lasing completely or severely degrade efficiency, due to the low gain at long wavelengths. Mitigation of photodarkening is considered in U.S. Pat. No. 6,154,598, where photodarkening due to unintentionally incorporated impurities is reduced by adding suitable rare-earth co-dopants to effectively shunt the upconversion process responsible for photodarkening. However, this technique may not be applicable if photodarkening results from the same dopant that provides the gain (as opposed to resulting from an unintentional impurity).

Another practical issue that can arise is excessive noise and/or self-pulsing of the laser. U.S. Pat. No. 5,953,353 considers an approach for mitigating this problem by increasing the cavity length of the fiber laser, typically by including a length of undoped standard single-mode fiber into the laser cavity such that 30% or more of the cavity length is undoped fiber.

Since there is an unmet need in the art for an efficient solid-state laser source suitable for direct frequency doubling to the yellow, it would be an advance in the art to provide such a source. It would also be an advance in the art to mitigate photodarkening in fiber lasers.

SUMMARY

According to an aspect of the invention, photodarkening in active fiber or waveguide devices can be reduced by altering the dopant concentration along the length of the doped fiber. The fiber device can be any fiber device utilizing a length of doped fiber, for example a standing-wave or traveling-wave fiber laser, a co-propagating or counter-propagating fiber amplifier, an ASE source, or a nonlinear fiber switch. The fiber device includes two or more intentionally doped fiber sections having different concentrations of one or more dopants. The dopants are responsive to pump radiation provided to the fiber resonator by a pump source and provide optical gain. A first optical intensity in a first of the fiber sections is greater than a second optical intensity in a second of the fiber sections. A first dopant concentration in the first fiber section is lower than a second dopant concentration in the second fiber section. Thus the dopant concentration is reduced in sections of the fiber device having a higher optical intensity. Reduced dopant concentration in regions of high optical intensity reduces photodarkening. The optical intensity can be due to pump radiation, signal radiation, or, in general, the combination of the pump and the signal radiation. Active fiber devices according to the invention can be any device utilizing a pumped doped fiber, including but not limited to: lasers, amplifiers, ASE sources and optical sources.

According to another aspect of the invention, a solid-state laser source directly frequency doubled to the yellow is provided. In one embodiment, the yellow source includes a fiber laser having photodarkening mitigation as described above.

DETAILED DESCRIPTION

Figure 1:
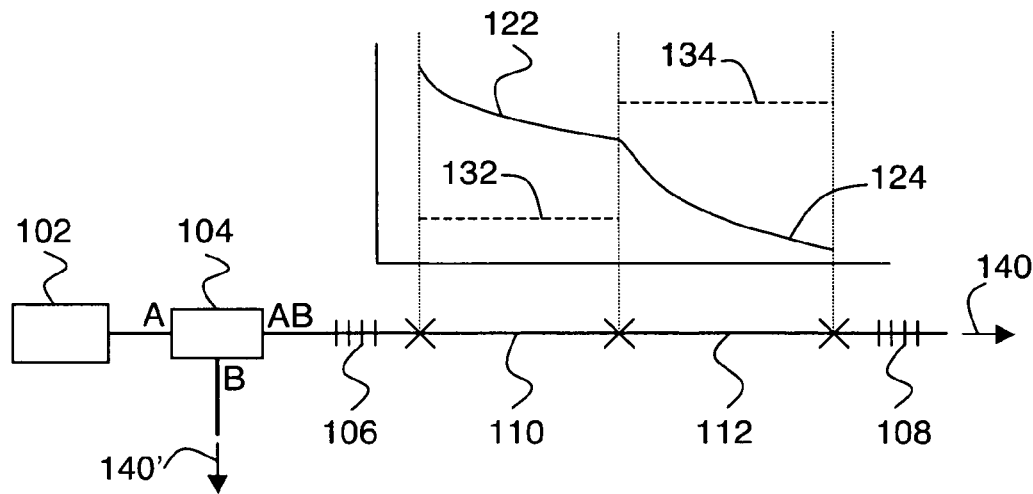
FIG. 1 shows a first embodiment of the invention.

FIG. 1 shows a first embodiment of the invention. A standing-wave fiber resonator includes a first intentionally doped fiber section 110, a second intentionally doped fiber section 112, a first fiber Bragg grating 106 and a second fiber Bragg grating 108 spliced together (each splice is shown as an "x" on FIG. 1). The fiber resonator is connected to a wavelength division multiplexer (WDM) 104. WDM 104 receives pump radiation from a pump source 102 at its port A and provides the pump radiation to the fiber resonator at its port AB. WDM 104 also receives laser output radiation from the fiber resonator and emits it from its port B as output radiation 140'. Output radiation from the fiber laser of FIG. 1 can also be emitted from fiber Bragg grating 108 as output radiation 140. As is well known in the art, the optical connections provided by WDM 104 are different for the pump and the laser output because the pump radiation and laser output radiation are at different wavelengths.

Fiber Bragg gratings 106 and 108 provide significant reflectivity at the lasing wavelength, thereby defining a laser resonator. Laser gain is provided by pumping the doped fiber sections 110 and 112. The dopant concentration in fiber sections 110 and 112 is schematically shown by curves 132 and 134, respectively. By design, the doping concentration in fiber section 110 is lower than the doping concentration in fiber section 112. The pump intensity in fiber sections 110 and 112 is schematically shown by curves 122 and 124, respectively. The pump intensity in fiber section 110 is greater than the pump intensity in fiber section 112, because radiation from pump source 102 must propagate all the way through fiber section 110 in order to reach fiber section 112.

As indicated above, having a reduced dopant concentration in regions of the fiber resonator having high pump intensity (e.g., fiber section 110) compared to regions of the fiber resonator having low pump intensity (e.g., fiber section 112) beneficially reduces photodarkening. Although only two fiber sections are shown in the example of FIG. 1, any number of fiber sections having different dopant concentrations can be employed in practicing the invention. For example, multiple fiber sections can be optically coupled (e.g., spliced together or butt-coupled) in sequence such that the pump intensity decreases in each successive fiber section and the dopant concentration increases in each successive fiber section.

The invention is broadly applicable to various dopants and types of doped fiber. Suitable dopants include, but are not limited to: Er, Yb, Nd, Tm, Ho, Pr, Sm, and Bi. Suitable doped fiber types include, but are not limited to: silica fiber, phosphate fiber, fluoride fiber, chalcogenide fiber, telluride fiber, polarization maintaining fiber, standard single-mode fiber, large-mode-area fiber, double-clad fiber, and holey fiber. Holey fiber is also known as photonic-crystal fiber, and has a transverse cross section designed to modify the photonic band structure of the fiber, typically by introducing structural periodicity at the wavelength or sub-wavelength scale. The invention does not depend critically on details of pump source 102, WDM 104, and Bragg gratings 106 and 108. Any other suitable arrangement for defining a fiber resonator and for providing pump radiation to the fiber resonator can also be employed in practicing the invention.

For example, any other kind of optical reflector can also be employed for defining the fiber resonator, including, but not limited to, multilayer coatings, metal coatings, or photonic crystals. Optical reflectors can be deposited or fabricated directly onto a fiber end. Alternatively, optical reflectors can be deposited or fabricated onto a substrate that is optically coupled to the fiber. Such optical coupling can be direct (e.g., the reflector on the substrate is pressed against the fiber end) or indirect (e.g., the reflector is optically coupled to the fiber end with micro-bulk optic lenses without physically contacting the fiber).

Figure 2:
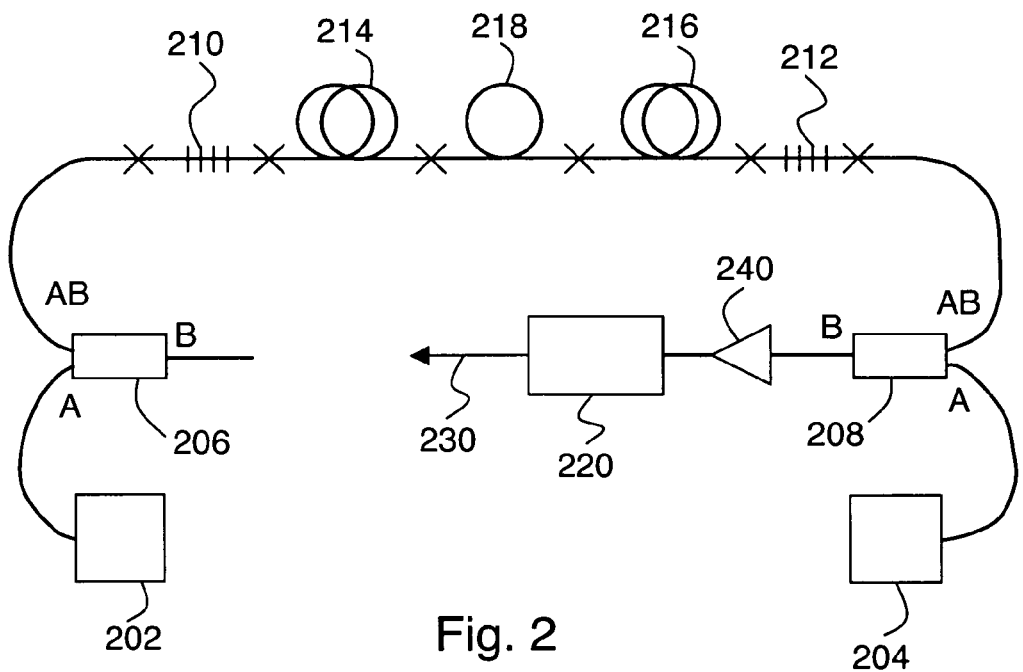
FIG. 2 shows a second embodiment of the invention.

FIG. 2 shows a second embodiment of the invention, suitable for generation of yellow light by direct frequency doubling of a Yb-doped fiber laser. In this example, the fiber resonator is defined by fiber Bragg grating (FBG) 210 acting as a high reflector (HR) and FBG 212 acting as an output coupler (OC). The gain medium between the fiber Bragg gratings includes a first fiber section 214, a second fiber section 216, and a third fiber section 218. Fiber sections 214 and 216 are each 4 m long and have a relatively low Yb concentration of $7.9 \times 10^{18}$ Yb/cm$^3$ providing a small-signal pump absorption of 80 dB/m. Fiber section 218 is 2 m long and has a much higher Yb concentration of $5.4 \times 10^{19}$ Yb/cm$^3$ providing a small-signal pump absorption of 550 dB/m. Since the pump absorption increases as the doping concentration increases, and since it can be measured optically, the small-signal pump absorption is a convenient parameter for quantifying the doping concentration in a doped fiber. In this example, all fibers in the fiber resonator are polarization-maintaining (PM) and have core sizes and numerical apertures similar to Corning PM 980 fiber.

The lasing wavelength for this source is 1150 nm. The HR and OC reflectivities at 1150 nm are 23 dB and 3.4 dB respectively. These relatively high reflectivities provide a low round-trip cavity loss, which is important since the gain provided by Yb at 1150 nm is low. Furthermore, the HR and OC reflectivities are extremely low (<0.0005 dB) in the 1030-nm spectral region, which is important for suppressing undesirable lasing in the 1030 nm band, where Yb provides high gain. The HR and OC have linewidths of 0.35 nm and 0.09 nm, respectively.

The fiber laser of FIG. 2 is pumped through its core from both ends with two single-mode 977-nm fiber-pigtailed laser diodes 202 and 204. The power from laser diodes 202 and 204 is coupled to the fiber resonator through wavelength division multiplexers 206 and 208 with 85% efficiency, providing a total incident pump power to FBGs 210 and 212 of 575 mW.

The high doping concentration of fiber section 218 is desirable for providing ground-state absorption (GSA) loss in the 1010-1040 nm range to suppress amplified spontaneous emission in this wavelength range. Furthermore, this high doping concentration enables the overall fiber laser cavity length to be reduced, thereby reducing passive propagation loss at 1150 nm. A final benefit of reducing the fiber laser cavity length is that the threshold for stimulated Brillouin scattering, which can be a limiting factor for high-power, narrow-band sources, is reduced. These factors taken together suggest a fiber laser design including only highly doped fiber (e.g., by omitting fiber sections 214 and 216 from the laser of FIG. 2).

However, such a laser was found to exhibit photodarkening of the highly doped fiber. Simulations of this laser show an optimal fiber length of 3.2 m (for maximum output power) if only the highly doped fiber is employed. Experimental results for a fiber laser with a 3.2-m length of highly doped fiber showed photodarkening. To reduce photodarkening, the length of highly doped fiber in the experimental laser was reduced by about 30 cm, and equal lengths (~100 cm) of moderately doped fiber were spliced to each end of the highly doped fiber such that the total small signal absorption remained about the same. This new laser was tested for photodarkening. This procedure was repeated until photodarkening was no longer experimentally observed at maximum pump power for approximately 30 minutes, resulting in the configuration described above in connection with FIG. 2. Further reduction of the length of doped fiber section 218 is not preferred, since it resulted in reduced laser slope efficiency.

Figure 3:
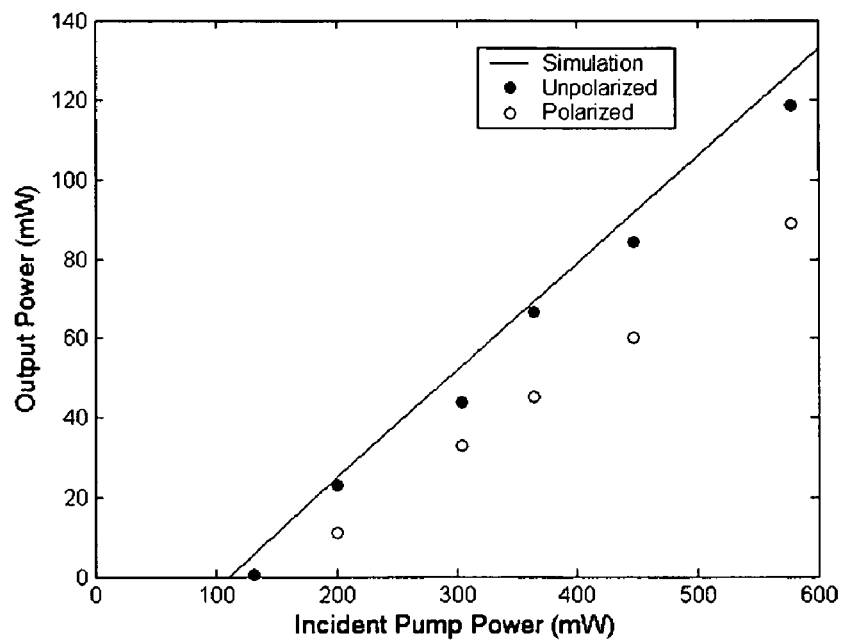
FIG. 3 shows the measured output power from an embodiment of the invention.

The laser of FIG. 2 was first operated in an unpolarized configuration. A maximum output power of 121 mW was achieved, as shown on FIG. 3. A slope efficiency of 26.4% and an optical efficiency of 21% were measured with respect to pump power incident on FBGs 210 and 212. The laser was operated for tens of hours at this power with no sign of photodarkening. Measured and simulated results agree well, as shown on FIG. 3. The only fitting parameter for the simulation was the Yb-doped fiber scattering loss at 1150 nm, which was found to be 110 dB/km. All other simulation parameters were available from the literature or provided by the fiber vendor.

Polarized operation of the laser was obtained by exploiting the polarization dependence of the FBGs. More specifically, the OC was spliced at 90° to the gain fibers, while the HR was aligned with the gain fibers. The OC was thermally tuned until its fast-axis peak-reflectivity wavelength matched the slow-axis peak-reflectivity wavelength of the HR. This allowed only light polarized on the slow axis of the gain fiber to experience maximum feedback and lase. This configuration provided a maximum output power of 89 mW and a stable linear state of polarization with a 16-dB extinction ratio. Decreasing the bandwidth of the HR would increase the extinction ratio. The slope and optical efficiencies were 20.4% and 15.5%, respectively.

Figure 4:
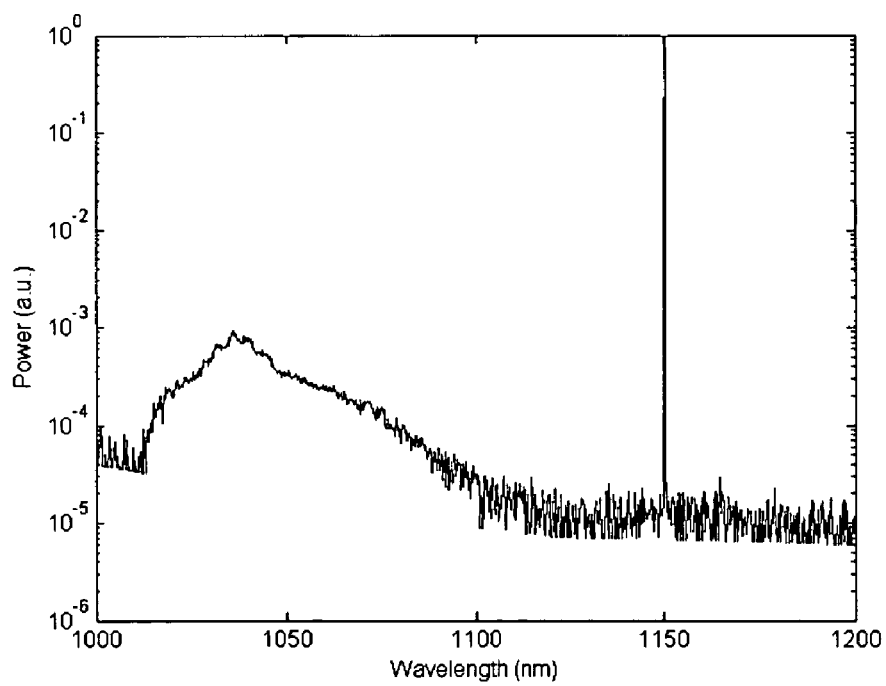
FIG. 4 shows the measured output spectrum from an embodiment of the invention.

FIG. 4 shows the laser output spectrum at maximum output power for operation at 1150.1 nm. The signal at the ASE peak wavelength of 1030 nm is 30 dB below the signal level, and the in-band ASE (i.e., near 1150 nm) is more than 45 dB below the signal level. Independent measurements showed than more than 98% of the total output power is in the 1150-nm line. The measured laser linewidth, inferred from an interferometric measurement of the coherence length, was 40±5 pm. Thermal tuning of FBGs 210 and 212 together tuned the laser output wavelength continuously by 0.8 nm, with the laser output power remaining constant to within 0.3 dB.

As indicated above, one aspect of the invention is providing a yellow source (i.e., having a wavelength from about 560 nm to about 600 nm) by direct frequency doubling of a solid state laser source. For this application, the required solid-state source wavelength is in the range of about 1120 nm to about 1200 nm.

Laser output radiation is emitted from port B of WDM 208 and is received by a frequency doubler 220. Optionally, a power amplifier 240 can be employed to increase the power provided to doubler 220. Yellow sources according to the invention do not depend critically on details of how the frequency doubling is performed, so any doubling configuration that provides sufficient second-harmonic conversion efficiency can be employed. For example, doubler 220 can include a nonlinear optical waveguide (for waveguide doubling), or it can include a nonlinear optical bulk crystal (for free-space doubling).

In the example of FIG. 2, doubler 220 includes a fiber-pigtailed, reverse-proton-exchanged periodically poled lithium niobate (PPLN) waveguide. For this waveguide, the full-width at half-maximum (FWHM) bandwidth was 96 pm, the length of the poled section was 3 cm, the total length was 5.2 cm, the estimated loss at 1150 nm was 0.1 dB/cm, the normalized efficiency was 200% $W^{-1}$ $cm^{-2}$, and the phase-matching temperature was 115.6° C. The waveguide endfaces were angle polished at 6° to prevent optical feedback into the laser. The loss of the laser to chip pigtail was estimated at 1.5 dB, which resulted in about 65 mW of infrared power being coupled into the waveguide. At the highest pump power, 40 mW of 575 nm radiation was generated inside the waveguide. The overall optical-to-optical efficiency of the doubled system was 7% with respect to incident diode laser pump power. Signs of photorefraction in the PPLN device were observed after several hours of operation. Nonlinear materials having greater resistance to photorefractive damage (e.g., stoichiometric $LiTaO_3$ or $Mg:LiNbO_3$, which can both be periodically poled) can be employed to alleviate this issue.

In cases where optional power amplifier 240 is employed, suppression of ASE within amplifier 240 is important, especially at the high-gain 1030-nm band. ASE filters can be employed in amplifier 240 to increase loss at 1030 nm while not significantly increasing loss at the operating wavelength. As is well-known in the art, one possible technique is inserting or creating one or more long-period fiber gratings in the amplifier gain fiber, to selectively couple ASE power from the fiber core to one or more cladding modes, thereby reducing the ASE power around 1030 nm traveling in the fiber and thus reducing gain saturation of the amplifier due to this ASE signal.

The preceding description has been by way of example as opposed to limitation, and the invention can also be practiced by making various modifications of the given examples.

Figure 5:
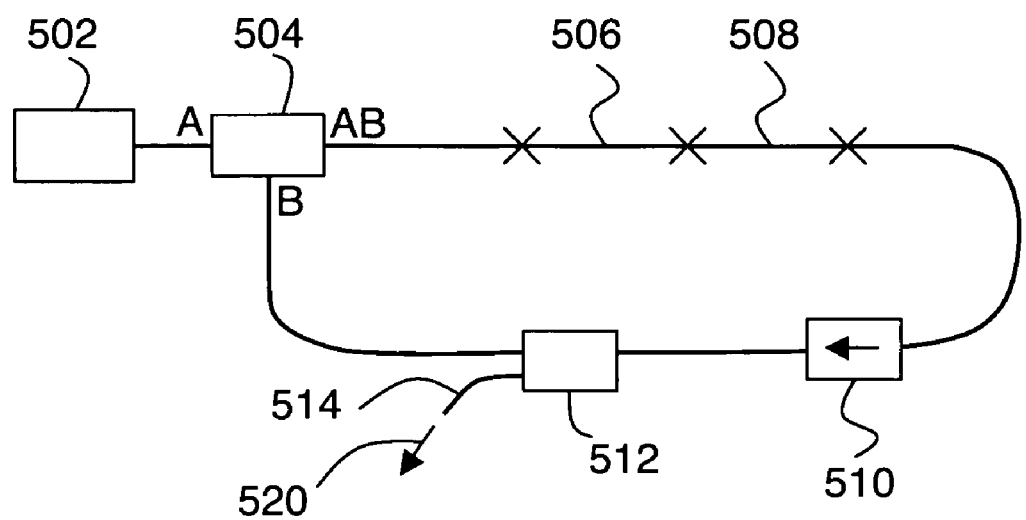
FIG. 5 shows a third embodiment of the invention.

For example, FIG. 5 shows a third embodiment of the invention, where a ring cavity is employed instead of a standing-wave cavity. A pump source 502 provides pump radiation to a WDM 504 which couples the pump radiation to a ring fiber resonator including a first doped fiber section 506 and a second doped fiber section 508. The dopant concentration in first section 506 is lower than the dopant concentration in second section 508. The pump intensity in first section 506 is greater than the pump intensity in second section 508. This example also includes an optical diode 510 which allows radiation to pass through it only in one direction, and a tap coupler 512 having an output port 514 from which laser output radiation 520 is emitted. An ASE filter (not shown) can be employed to suppress ASE and/or lasing at undesired wavelengths. For applications where operation at low gain is required (e.g., for yellow sources as described above), a standing-wave cavity is preferred, since it is more difficult to suppress ASE and spurious lasing in a fiber ring resonator than in a fiber standing-wave resonator.

Lasers according to the invention can be pulsed lasers or continuous-wave lasers. Doping concentration changes according to the invention can be discrete (e.g., obtained by splicing fibers having different dopant concentrations together), or they can be continuous (e.g., doping can be monotonically varied during fiber manufacture). Pumping a fiber having a monotonic doping variation from the low-concentration end is another way of practicing the invention. Any division of such a fiber into two sections will provide one section having higher pump intensity and lower doping than the other section.

In the preceding examples, doping concentration is reduced in regions of relatively high pump intensity to mitigate photodarkening. The present invention can also be used to mitigate photodarkening caused by a high signal intensity by reducing the dopant concentration in regions of high signal intensity or in regions of high combined signal and pump intensity. Although longer wavelength radiation (i.e., the signal) tends to be less effective at inducing photodarkening than shorter wavelength radiation (i.e., the pump), the signal intensity can be many times larger than the pump intensity (especially in a laser oscillator), and in such cases, the signal may be a significant (or even dominant) source of photodarkening. In cladding-pumped fiber or waveguide amplifiers, the signal is significantly more tightly confined than the pump, so even if the signal power is comparable to or less than the pump power, the signal may be a more significant source of photodarkening than the pump.

Design of fiber and waveguide lasers and amplifiers in accordance with the principles of the invention (i.e., reducing the dopant concentration in regions of high pump and/or signal intensity) can be accomplished with commercially available fiber modeling software based on the rate equations relevant to the laser ions responsible for the laser effect in the doped fiber. Iterative design may be required, since the z-dependent signal intensity (where z is the position along the length of the fiber) in a laser or amplifier depends on the doping profile along z in a complicated manner. Furthermore, this design problem depends on the pump power level. For example, a fiber laser or amplifier optimized for minimal photodarkening at a given power may not be fully optimal at other operating powers.

In view of these considerations, for a fiber or waveguide laser pumped at only one end of a standing-wave cavity (e.g., as in FIG. 1), it is preferred for the high-reflector of the laser cavity to be at the pumped end of the cavity. In the example of FIG. 1, it is preferable for the reflectivity of reflector 106 to be higher than the reflectivity of reflector 108, so that reflector 108 serves as the output coupler and reflector 106 serves as the high reflector. The reason for this is that the signal intensity in such a cavity tends to be highest at or near the high reflector. Thus fiber section 110 having relatively low doping has a higher pump and a higher signal intensity than fiber section 112 having relatively high doping. The configuration discussed in this paragraph is preferable when the laser efficiency is large enough that the signal intensity traveling in the doped fiber is high enough to cause significant photodarkening. In low-efficiency fiber and waveguide lasers, the signal intensity inside the doped fiber may be low enough that the signal-induced photodarkening is negligible, and the output coupler can then be placed at either end of the laser cavity.

For a fiber laser pumped from both ends (e.g., as in FIG. 2), the dopant concentration can be decreased at the fiber ends to reduce photodarkening due to the pump. This reduction in dopant concentration can also help reduce photodarkening due to the signal.

In a co-propagating fiber amplifier, the pump intensity is highest at the pump and signal input end, and the signal intensity is highest at the output end. For low efficiency amplifiers, the signal intensity can typically be neglected, and the dopant concentration can be based on the pump intensity alone (i.e., reduced dopant concentration at the pump input). For efficient amplifiers, the dopant concentration can be reduced at both ends (i.e., the input, where the pump intensity is maximum, and the output, where the signal intensity is typically maximum).

In a counter-propagating fiber amplifier, the pump and signal intensities are both maximal at the pump input end, so this region of the fiber should have reduced dopant concentration. Bi-directionally pumped fiber amplifiers should have a reduced doping at both ends.

Although the preceding examples relate to fiber gain media, the invention is applicable to any waveguide gain medium. Suitable waveguide gain media include but are not limited to: optical fibers, core-pumped fibers, cladding-pumped fibers, integrated-optic waveguides, photonic-bandgap waveguides, circular cross-section waveguides, rectangular cross-section waveguides, and waveguides having arbitrary transverse cross sections. Thus, in broad terms, the invention relates to a waveguide gain module having two waveguide sections disposed in series, with one waveguide section having higher dopant concentration and lower optical intensity than the other waveguide section. Any number of waveguide sections can be included in this manner, as can a continuous variation of dopant concentration.

The invention is applicable to lasers, amplifiers, and optical sources in general (e.g., ASE sources), as well as to any other device utilizing a waveguide doped with an ion susceptible to photodarkening. Any such device can include a waveguide gain module as described above.

The invention claimed is:

1. A waveguide gain module comprising:
   a source of pump radiation;
   a waveguide configured to receive the pump radiation and to provide optical gain, wherein the waveguide includes two or more intentionally doped waveguide sections disposed in series and having different concentrations of one or more dopants;
   wherein the one or more dopants, responsive to the pump radiation, provide the optical gain;
   wherein a first optical intensity in the first waveguide section is greater than a second optical intensity in the second waveguide section; and
   wherein a first doping concentration in the first waveguide section is lower than a second doping concentration in the second waveguide section;
   wherein each of said intentionally doped waveguide sections has a length less than 10 meters;
   wherein each of said intentionally doped waveguide sections has a small signal pump absorption greater than 50 dB/m.

2. The waveguide gain module of claim 1, wherein a doping concentration changes continuously between said first and said second waveguide sections.

3. The waveguide gain module of claim 1, wherein said first and said second waveguide sections are spliced together.

4. The waveguide gain module of claim 1, wherein said dopants are selected from the group consisting of Er, Yb, Nd, Tm, Pr, Sm, Ho, and Bi.

5. The waveguide gain module of claim 1, wherein said doped waveguide sections are selected from the group consisting of silica fiber, phosphate fiber, fluoride fiber, chalcogenide fiber, telluride fiber, polarization-maintaining fiber, standard single-mode fiber, large-mode-area fiber, double-clad fiber, holey fiber, integrated-optic waveguides, photonic-bandgap waveguides, circular cross-section waveguides, and rectangular cross-section waveguides.

6. The waveguide gain module of claim 1, further comprising one or more additional sources of additional pump radiation, wherein said waveguide is configured to receive the additional pump radiation, and wherein said one or more dopants, responsive to the additional pump radiation, provide optical gain.

7. The waveguide gain module of claim 1, wherein said first and second optical intensities are substantially intensities of said pump radiation.

8. The waveguide gain module of claim 1, wherein said first and second optical intensities are substantially intensities of signal radiation.

9. The waveguide gain module of claim 1, wherein said first and second optical intensities are combined intensities of said pump radiation and signal radiation.

10. An optical amplifier or an optical source comprising the waveguide gain module of claim 1.

11. The waveguide gain module of claim 1, wherein a dopant concentration profile along said waveguide is selected to optimize a compromise between minimizing photodarkening and maximizing output power.

12. A fiber gain module comprising:
a source of pump radiation;
a doped fiber configured to receive the pump radiation and to provide optical gain, wherein the doped fiber includes two or more intentionally doped fiber sections disposed in series and having different concentrations of one or more dopants;
wherein the one or more dopants, responsive to the pump radiation, provide the optical gain;
wherein a first optical intensity in the first fiber section is greater than a second optical intensity in the second fiber section; and
wherein a first doping concentration in the first fiber section is lower than a second doping concentration in the second fiber section;
wherein each of said intentionally doped fiber sections has a length less than 10 meters;
wherein each of said intentionally doped fiber sections has a small signal pump absorption greater than 50 dB/m.

13. An optical source or an optical amplifier comprising the fiber gain module of claim 12.

14. A fiber laser comprising the fiber gain module of claim 12 disposed within a fiber resonator, wherein laser output radiation is emitted from the fiber resonator.

15. The fiber laser of claim 14, wherein said laser output radiation includes radiation having a wavelength in a range from about 1120 nm to about 1200 nm.

16. The fiber laser of claim 14, wherein said fiber laser is either a continuous-wave laser or a pulsed laser.

17. The fiber laser of claim 14, wherein said fiber resonator comprises a standing-wave resonator or a traveling-wave resonator.

18. The fiber laser of claim 14, wherein said fiber resonator comprises a standing-wave resonator, and wherein the standing-wave resonator comprises narrow-band feedback elements having center wavelengths corresponding to a wavelength of said laser output radiation.

19. The fiber laser of claim 18, wherein said narrow-band feedback elements comprise fiber Bragg gratings.

20. The fiber laser of claim 14, further comprising a frequency doubler configured to receive said laser output radiation and to provide second harmonic radiation having twice the frequency of said laser output radiation.

21. The fiber laser of claim 20, wherein said second-harmonic radiation includes radiation having a wavelength in a range from about 560 nm to about 600 nm.

22. The fiber laser of claim 20, wherein said frequency doubler comprises a nonlinear optical waveguide.

23. The fiber laser of claim 20, wherein said frequency doubler comprises a nonlinear optical bulk crystal.

24. The fiber laser of claim 14, further comprising:
a power amplifier configured to receive said laser output radiation and to provide amplified radiation having a larger power than said laser output radiation; and
a frequency doubler configured to receive said amplified radiation and to provide second-harmonic radiation having twice the frequency of said laser output radiation.

25. A method of providing optical gain in a waveguide, the method comprising:
providing pump radiation to a waveguide, wherein the waveguide includes two or more intentionally doped waveguide sections disposed in series having different concentrations of one or more dopants;
wherein the one or more dopants, responsive to the pump radiation, provide optical gain;
wherein a first optical intensity in a first of the waveguide sections is greater than a second optical intensity in a second of the waveguide sections; and
wherein a first doping concentration in the first waveguide section is lower than a second doping concentration in the second waveguide section,
wherein each of said intentionally doped waveguide sections has a length less than 10 meters;
wherein each of said intentionally doped waveguide sections has a small signal pump absorption greater than 50 dB/m.

* * * * *

UNITED STATES PATENT AND TRADEMARK OFFICE
CERTIFICATE OF CORRECTION

| | | |
|---|---|---|
| PATENT NO. | : 7,477,672 B2 | Page 1 of 1 |
| APPLICATION NO. | : 11/508550 | |
| DATED | : January 13, 2009 | |
| INVENTOR(S) | : Sinha et al. | |

It is certified that error appears in the above-identified patent and that said Letters Patent is hereby corrected as shown below:

In The Specification Under Column 1:

• Please replace lines 15-19 with:

-- FEDERALLY SPONSORED RESEARCH OR DEVELOPMENT
This invention was made with Government support under contract DAAD19-02-1-0184 awarded by the U.S. Army RDECOM Acquisition Center. The Government has certain rights in this invention. --

Signed and Sealed this
Nineteenth Day of April, 2011

David J. Kappos
*Director of the United States Patent and Trademark Office*